United States Patent
Zhu (10) Patent No.: US 9,426,807 B2
(45) Date of Patent: Aug. 23, 2016

(54) METHOD AND APPARATUS FOR ACQUIREMENT OF AVAILABLE SPECTRUM

(71) Applicant: Huawei Technologies Co., Ltd., Shenzhen, Guangdong (CN)

(72) Inventor: Lei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/577,256

(22) Filed: Dec. 19, 2014

(65) Prior Publication Data

US 2015/0105093 A1    Apr. 16, 2015

Related U.S. Application Data

(63) Continuation of application No. PCT/CN2013/076532, filed on May 31, 2013.

(30) Foreign Application Priority Data

Jun. 27, 2012 (CN) .......................... 2012 1 0217693

(51) Int. Cl.
*H04W 24/00* (2009.01)
*H04W 72/04* (2009.01)
*H04W 16/14* (2009.01)

(52) U.S. Cl.
CPC ............ *H04W 72/048* (2013.01); *H04W 16/14* (2013.01)

(58) Field of Classification Search
CPC ............................ H04W 72/048; H04W 24/00
USPC ................. 455/450–452.1, 456.1–456.6
See application file for complete search history.

(56) References Cited

U.S. PATENT DOCUMENTS

| | | | |
|---|---|---|---|
| 8,681,709 B2 * | 3/2014 | Sennett | H04W 16/14 370/329 |
| 2010/0185749 A1 * | 7/2010 | Sawai | H04W 16/14 709/219 |
| 2010/0246506 A1 | 9/2010 | Krishnaswamy | |
| 2011/0205979 A1 | 8/2011 | Silk et al. | |
| 2012/0071188 A1 | 3/2012 | Wang et al. | |
| 2014/0120975 A1 | 5/2014 | Liu et al. | |

FOREIGN PATENT DOCUMENTS

| | | |
|---|---|---|
| CN | 1885753 A | 12/2006 |
| CN | 101500238 A | 8/2009 |

(Continued)

*Primary Examiner* — Michael T Vu
(74) *Attorney, Agent, or Firm* — Leydig, Voit & Mayer, Ltd.

(57) ABSTRACT

The present invention provides a method and apparatus thereof for acquirement of available spectrum. The method comprises: receiving an inquiring request sent from a main device, said inquiring request carrying the location information and coverage information of said main device; according to the location information and coverage information of said main device, acquiring the geographical range which said main device can cover; according to the geographical range which said main device can cover, the available spectrum set obtained in advance in the preset geographical range, and the geographical range which can be covered corresponding to each available spectrum in said available spectrum set, acquiring the available spectrum information in the geographical range which said main device can cover; sending said available spectrum information to said main device. The apparatus comprises: a receiving module, an inquiring module, a first inquiring module and a transmitting module.

18 Claims, 6 Drawing Sheets

(56) References Cited

FOREIGN PATENT DOCUMENTS

| CN | 101909302 A | 12/2010 |
| CN | 102014504 A | 4/2011 |
| CN | 102075858 A | 5/2011 |
| CN | 201947445 U | 8/2011 |
| CN | 102232307 A | 11/2011 |

\* cited by examiner

METHOD AND APPARATUS FOR ACQUIREMENT OF AVAILABLE SPECTRUM

CROSS-REFERENCE TO RELATED APPLICATIONS

This application is a continuation of International Patent Application No. PCT/CN2013/076532, filed on May 31, 2013, which claims the priority to Chinese Patent Application No. 201210217693.0, filed on Jun. 27, 2012, both of which are incorporated by reference in its entirety herein.

TECHNICAL FIELD

The present invention relates to the field of wireless communication technology, and particularly to a method and an apparatus for acquiring an available spectrum.

BACKGROUND

In recent years, people's demand on wireless broadband services keeps growing. Wireless access at anytime and anywhere becomes an inevitable trend with applications of popular networks such as microblog and Social Networking Services (abbreviated as SNS) and wide uses of smart phones such as Apple and Android. For a Universal Mobile Telecommunication System (abbreviated as UMTS) or a gradually commercialized Long Term Evolution (abbreviated as LTE) or Wireless Local Area Networks (abbreviated as WLAN) hotspots throughout cities, an growing requirement on mobile data traffic caused by increasing access users or prolonged online time leads to an increasing burden on the access network and a requirement on an increasing bandwidth, and the problem needs to be addressed.

Since new spectrum resources are almost allocated and it is unlikely to get a quota, it is not realistic to solve the above problem by seeking for new allocated spectrum resources. Therefore, improving spectrum utilization and increasing system capacity are preferred solutions for the above problem.

SUMMARY

To effectively improve frequency utilization, a method for acquiring an available spectrum is provided by the invention. The method includes:

receiving an inquiring request sent from a master device, where the inquiring request carries location information of the master device and coverage range information of the master device;

acquiring a coverable geographical range of the master device according to the location information of the master device and the coverage range information of the master device;

acquiring information about the available spectrum within the coverable geographical range of the master device according to the coverable geographical range of the master device, a set of available spectra within a preset geographical range and a coverable geographical range of each available spectrum in the set of available spectra obtained in advance; and sending the information about the available spectrum to the master device.

In another aspect, an apparatus for acquiring an available spectrum is provided by the invention. The apparatus includes:

a receiving module, configured to receive an inquiring request sent from a master device, where the inquiring request carries location information of the master device and coverage range information of the master device;

an acquiring module, configured to acquire a coverable geographical range of the master device according to the location information of the master device and the coverage range information of the master device received by the receiving module;

a first acquiring module, configured to acquire information about the available spectrum within the coverable geographical range of the master device according to the coverable geographical range of the master device acquired by the acquiring module, a set of available spectra within a preset geographical range and a coverable geographical range of each available spectrum in the set of available spectra obtained in advance; and a sending module, configured to send the information about the available spectrum acquired by the first acquiring module to the master device.

Technical effects of the invention are as follows. A coverable geographical range of the master device is acquired according to the location information and coverage range information of the master device, and information about the available spectrum within the coverable geographical range of the master device is determined according to both the set of available spectra within the preset geographical range and the coverable geographical range of each available spectrum in the set of available spectra obtained in advance. Compared with the conventional conditions, few signaling interactions are required and both the set of available spectra within the preset geographical range and the coverable geographical range of each available spectrum in the set of available spectra are obtained in advance in the method for acquiring the available spectrum provided by the invention, therefore, efficiency of acquiring an available spectrum of the master device is improved without interfering with existing services, and spectrum utilization is improved.

DESCRIPTION OF EMBODIMENTS

Figure 1:
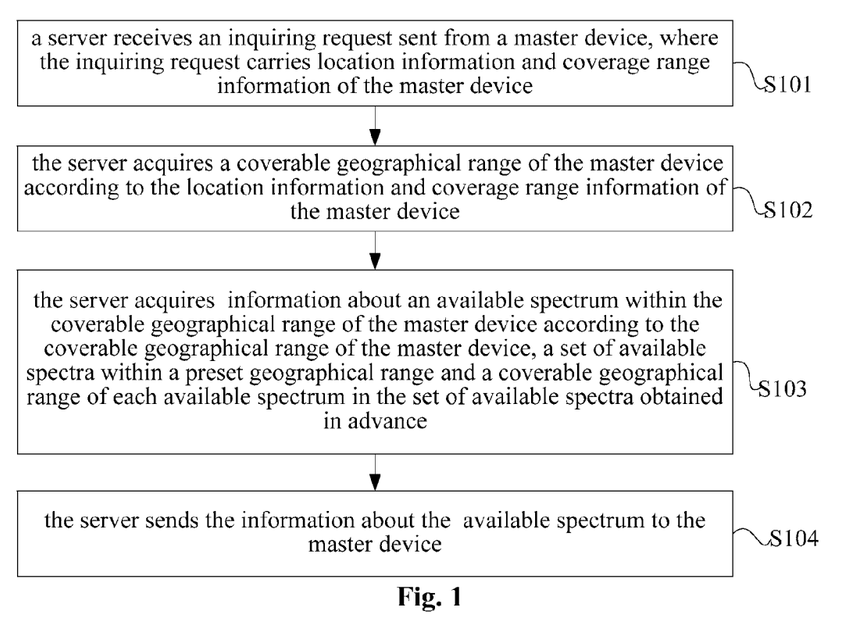
FIG. 1 is a flow chart of a method for acquiring an available spectrum provided by an embodiment of the invention.

FIG. 1 is a flow chart of a method for acquiring an available spectrum provided by an embodiment of the invention. As shown in FIG. 1, the method includes S101-S104.

In S101, a server receives an inquiring request sent from a master device, where the inquiring request carries location information of the master device and coverage range information of the master device.

The master device in embodiments of the invention refers to a communication device, such as a Wireless Fidelity (abbreviated as WiFi) hotspot, a mobile communication base station and a handheld terminal.

The location information of the master device may be determined as follows. In a case that the master device is located outdoors, the location information of the master device may be obtained by Global Positioning System (abbreviated as GPS). In a case that the master device is located indoors, the location information of the master device may be obtained by, for example, a Radio Frequency Identification (abbreviated as FRID) positioning technology, a positioning technology based on a physical port, a positioning technology based on WiFi or a positioning technology based on a sensor. In other words, the location information of the master device may be regarded as information of a point, such as location information of (north latitude xx degree, east longitude yy degree) which uniquely locates a geographical location.

Theoretically, most communication device, such as a base station and a WiFi hotspot, has a sphere coverage range, which is a circle coverage range in a two-dimensional space. A directional antenna has a sectorial coverage range in a two-dimensional space. The coverage range of the master device is mainly determined by a type of the master device and a transmitting power of the master device, and other factors such as antenna height, propagation features (sector, angle) of electromagnetic waves, and surroundings (such as buildings, mountains, border lines) also help to determine the coverage range of the master device. The coverage range of the master device has accuracy, and accuracy ranging from 10 meters to 20 meters is acceptable. In a case that the master device is a fixed base station, the coverage range of the fixed base station may be a circle with a radius ranging from several hundred meters to a dozen kilometers. In a case that the master device is a small moveable base station or a WiFi hotspot, the coverage range may be a circle with a radius less than 50 meters. In other words, the coverage range information of the master device may be regarded as information of a surface.

In S102, the server acquires a coverable geographical range of the master device according to the location information of the master device and the coverage range information of the master device.

The coverable geographical range of the master device may be acquired by determining a geographic coordinate according to the location information of the master device and obtaining a geographical range according to the geographic coordinate in combination with the coverage range of the master device. For example, if the coverage range of the master device is a circle in a two-dimensional space, the location information of the master device is the center of the circle, and a radius of the circle may be determined by the coverage range, so that a specific geographical range is obtained.

In S103, the sever acquires information about an available spectrum within the coverable geographical range of the master device according to the coverable geographical range of the master device, a set of available spectra within a preset geographical range and a coverable geographical range of each available spectrum in the set of available spectra obtained in advance.

The available spectrum within the preset geographical range and the coverable geographical range of the available spectrum are usually obtained in advance and are updatable. The set of available spectra within the preset geographical range and the coverable geographical range of each available spectrum in the set of available spectra may be stored in a database, and the database where the available spectrum and the coverable geographical range of the available spectrum are stored may be located in the sever, or located in other computers that can communicate with the server.

In S104, the server sends the information about the available spectrum to the master device.

With the solution provided by the embodiment of the invention, the coverable geographical range of the master device is acquired according to the location information and coverage range information of the master device, and information about the available spectrum within the coverable geographical range of the master device is determined according to both the set of available spectra within the preset geographical range and the coverable geographical range of each available spectrum in the set of available spectra obtained in advance. Compared with the conventional conditions, few signaling interactions are required and both the set of available spectra within the preset geographical range and the coverable geographical range of each available spectrum in the set of available spectra are obtained in advance in the method for acquiring the available spectrum provided by the invention, therefore, efficiency of acquiring an available spectrum of the master device is improved without interfering with existing services, and spectrum utilization is improved.

Figure 2:
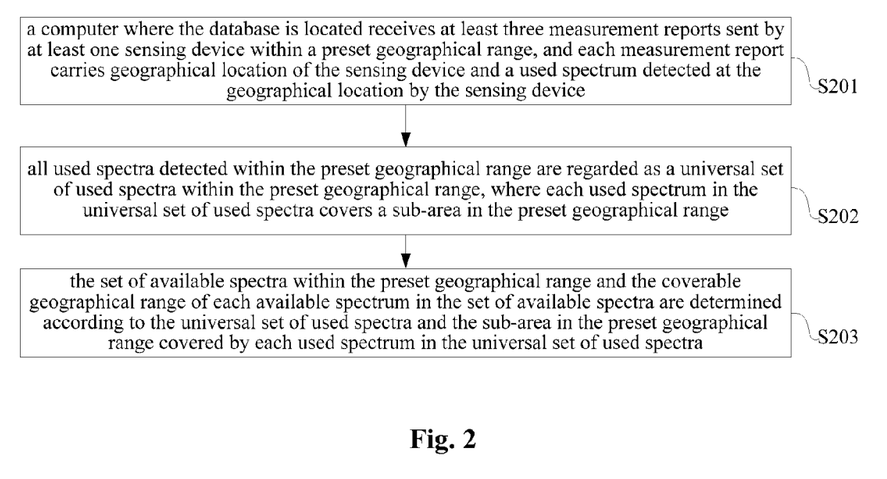
FIG. 2 is a flow chart of a method for obtaining a set of available spectra within a preset geographical range and a coverable geographical range of each available spectrum in the set of available spectra provided by another embodiment of the invention.

Based on the foregoing embodiment, another embodiment is provided by the invention, which focuses on describing a preferable method for acquiring the set of available spectra within the preset geographical range and the coverable geographical range of each available spectrum in the set of available spectra, which is mentioned in the foregoing embodiment. FIG. 2 is a flow chart of the method for acquiring the set of available spectra within a preset geographical range and the coverable geographical range of each available spectrum in the set of available spectra provided by the another embodiment. As shown in FIG. 2, the method includes S201-S203.

In S201, a computer where a database is located receives at least three measurement reports sent by at least one sensing device in a preset geographical range, and each measurement report carries geographical location of the sensing device and a used spectrum detected at the geographical location by the sensing device.

The sensing device may be, but is not limited to, a WiFi hotspot, a base station, a mobile terminal. There may be one sensing device keeps moving in a preset detection area and reporting basic data information to the server, or there may be multiple sensing devices at various fixed locations in the preset geographical range acquiring basic data information respectively and reporting the basic data information to the server. The master device may also have a function of the sensing device. It is to be noted that, considering the stability of spectrum resources, the sensing device is unnecessary to always stay at a power on state to listen, but may detect a surrounding spectrum condition periodically or by triggering, to save power of the sensing device.

The computer where the database is located may obtain basic data information P (Location, Spectrum) for the database according to parameters carried by each received measurement report.

In S202, all used spectra detected within the preset geographical range are taken as a universal set of used spectra within the preset geographical range, where each used spectrum in the universal set of used spectra covers a sub-area in the preset geographical range.

Figure 3:
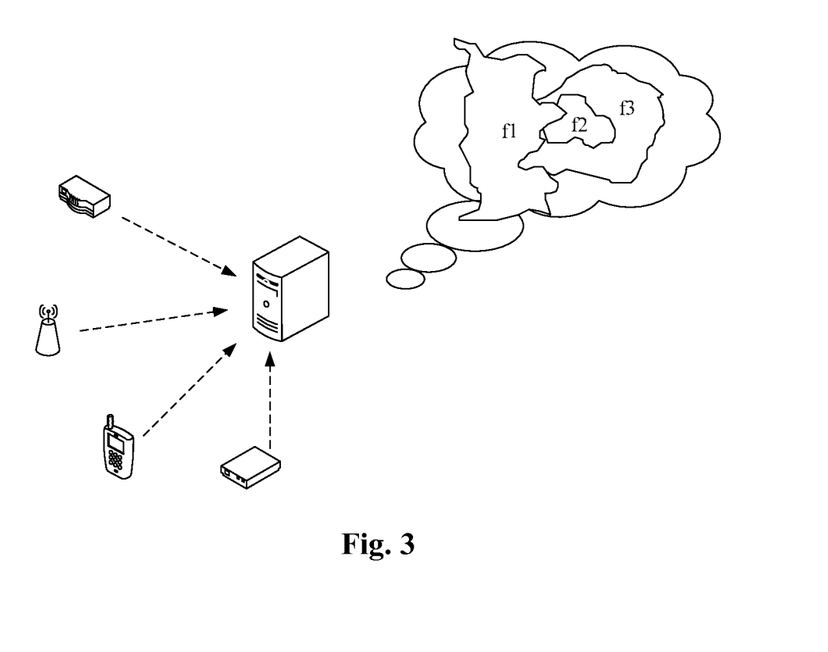
FIG. 3 is a schematic diagram of a cloud model of usage state of spectra provided by another embodiment of the invention.
Figure 4:
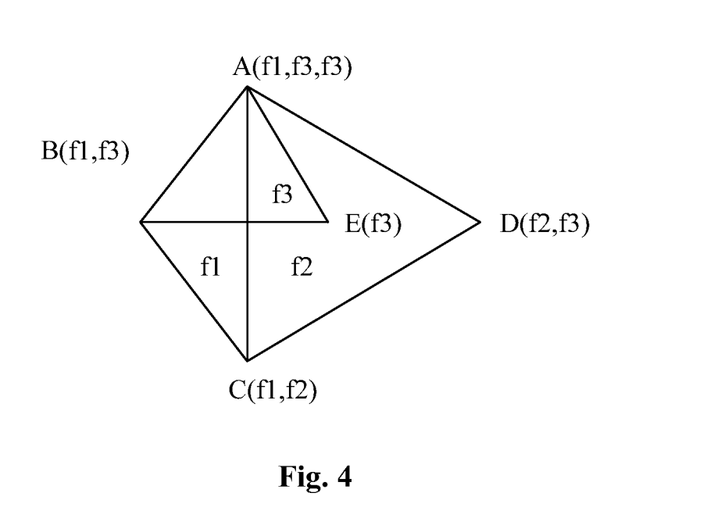
FIG. 4 is a simplified diagram of the cloud model shown in FIG. 3.

There are a variety of ways to implement S202. In this embodiment, S202 is implemented by constructing a used spectrum cloud model (abbreviated as USCM) in the database. The USCM model is mainly used to present real-time and dynamic usage of spectra in an area. A used spectrum cloud model may be but is not limited to a diagram shown in FIG. 3. FIG. 4 is a simplified diagram of the cloud model shown in FIG. 3. For convenience of description, irregular areas in FIG. 3 is simplified as areas with straight sides, thus the cloud model can be illustrated in regular shapes. A, B, C, D, and E are five geographically adjacent points. For example, each location is provided with a sensing device to detect spectra of signals around. For example, the spectra detected at point A are f1, f2 and f3, and the basic data information is indicated by A (f1, f2, f3) in FIG. 4. Points having a same spectrum are connected to each other, and thus a distribution cloud diagram of used spectra is formed. It can be known from FIG. 4 that an area of triangle ABC is indicated by G1, and spectrum f1 is used in this area, therefore triangle ABC is indicated by G1 (f1). Similarly, triangle ACD is indicated by G2 (f2), and triangle ABE is indicated by G3 (f3). For overlapped areas, for example, in the overlapped area of G1 and G3, spectra f1 and f3 are used, then the overlapped area is indicated by G1∩G3 (f1, f3). Similarly, in the overlapped area of G2 and G3, spectra f2 and f3 are used, then the overlapped area is indicated by G2 ∩G3 (f2, f3). Other conditions can be obtained similarly and are not repeatedly described herein.

In S203, the set of available spectra within the preset geographical range and the coverable geographical range of each available spectrum in the set of available spectra are determined according to the universal set of used spectra and the sub-area covered by each used spectrum in the preset geographical range.

The USCM model obtained in S202 may be used to determine an available spectrum cloud model (abbreviated as ASCM), i.e., the set of available spectra within the preset geographical range and the coverable geographical range of each available spectrum in the set of available spectra. For all spectrum resources within the preset geographical range, the ASCM model may be regarded as a complementary set of the USCM model. In particular, available spectra in each area may be obtained by calculating a complementary set of spectra of the USCM model in the corresponding area. The implementation thereof may include but is not limited to the following.

In a sub-area which is covered by an i-th used spectrum in the preset geographical range and which is not overlapped with other sub-areas, the available spectra are the universal set of used spectra excluding the i-th used spectrum, and the coverable geographical range is the sub-area covered by the i-th used spectrum in the preset geographical range. In a sub-area overlapped by a sub-area covered by a j-th used spectrum in the preset geographical range and the sub-area covered by the i-th used spectrum in the preset geographical range, the available spectra are the universal set of used spectra excluding the i-th used spectrum and the j-th used spectrum, and the coverable geographical range is the sub-area overlapped. The i and j are different positive integers.

Referring to FIG. 4 which is the simplified diagram of the USCM model, provided that the universal set of spectra is (f1, f2, f3), $\overline{G1}$ (f2, f3) indicates that available spectra in area G1 are f2 and f3, $\overline{G2}$ (f1, f3) indicates that available spectra in area G2 are f1 and f3, $\overline{G3}$ (f1, f2) indicates that available spectra in area G3 are f1 and f2, $\overline{G1 \cap G3} = \overline{G1} \cup \overline{G3} = $ f2 indicates that an available spectrum in an overlapped area of G1 and G3 is f2, $\overline{G2 \cap G3} = \overline{G2} \cup \overline{G3} = $ f1 indicates that an available spectrum in an overlapped area of G2 and G3 is f1, and other conditions can be obtained similarly and are not repeatedly described herein.

It is to be noted that for the USCM model and the ASCM model mentioned in the above second embodiment, the basic data information varies dynamically with time because of variations such as periodic or random turning on and turning off of sensing devices and of wireless service transmitting, blocking and fading of signals, and other position factors, therefore, the USCM model and the ASCM model constructed based on the basic data information also vary dynamically with time, and real-time update or regular update may be performed on the USCM model and the ASCM model.

Based on the foregoing embodiments, a third embodiment focuses on describing a preferable method for acquiring information about the available spectrum within the coverable geographical range of the master device mentioned in the foregoing embodiments. The method may include taking a first available spectrum as an available spectrum within the coverable geographical range of the master device in a case that coverable geographical range of the first available spectrum in the set of available spectra includes the coverable geographical range of the master device.

Figure 5:
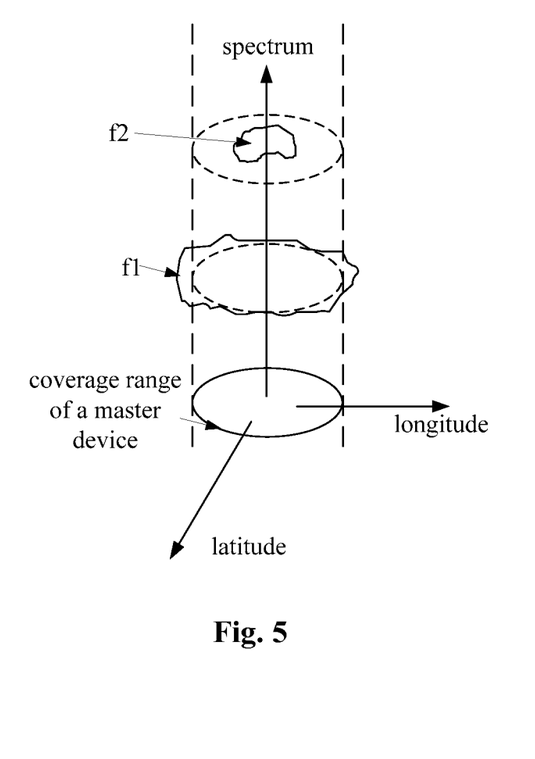
FIG. 5 is a schematic diagram of an available spectrum, a coverable geographical range of the available spectrum, and a coverable geographical range of a master device in a three-dimensional coordinate system provided by further another embodiment of the invention.

The first available spectrum indicates any one available spectrum in the universal set of available spectra within the preset geographical range. The method is described by examples below. By replacing an altitude factor in a three-dimensional geographical location (geolocation-3d) with an available spectrum, the three-dimensional geographical location may be regarded as a new three-dimensional rectangular coordinate system constructed by latitude, longitude and available spectrum, where x axis, y axis and z axis are latitude, longitude and available spectrum respectively. Provided that there is an available spectrum f within a certain area, the area may be expressed in the three-dimensional rectangular coordinate system as an area parallel to xoy plane and z=f. Reference is made to FIG. 5 which is a schematic diagram of an available spectrum, a coverable geographical range of the available spectrum and a coverable geographical range of the master device in a three-dimensional coordinate system. The coverable geographical range of the master device is drawn in the above coordinate system with the location information of the master device as a center point of xoy plane. In FIG. 3, the coverable geographical range of f1 includes the coverable geographical range of the master device, and therefore, f1 may be taken as an available spectrum within the coverable geographical range of the master device.

It is to be noted that in a case that the coverable geographical range of the master device is in a plurality of sub-areas, that is, the coverable geographical range of the master device locates at a plurality of sub-areas but is not necessary to be completely overlapped with the sub-areas, an intersection of the available spectra in the sub-areas is taken as an available spectrum within the coverable geographical range of the master device.

In a special condition, the coverable geographical range of the master device is not completely covered by a coverable geographical range of an available spectrum, and there is no available spectrum in the portion not covered by the coverable geographical range of the available spectrum or the available spectra in the portion not covered by the coverable geographical range of the available spectrum has no intersection with the available spectra within the main coverage, therefore, the master device has no available spectrum. In this case, a tolerance or a threshold of the master device to co-channel interference may be used, where the tolerance to the co-channel interference is a ratio of the portion of the coverable geographical range of the master device that is not covered by the coverable geographical range of the available spectrum to the whole coverable geographical range of the master device. In this case, the master device may use the available spectrum within the main coverage. By introducing the tolerance of the master device to co-channel interference, communication capacity of the device is improved at a cost that a small area is interfered.

Figure 6:
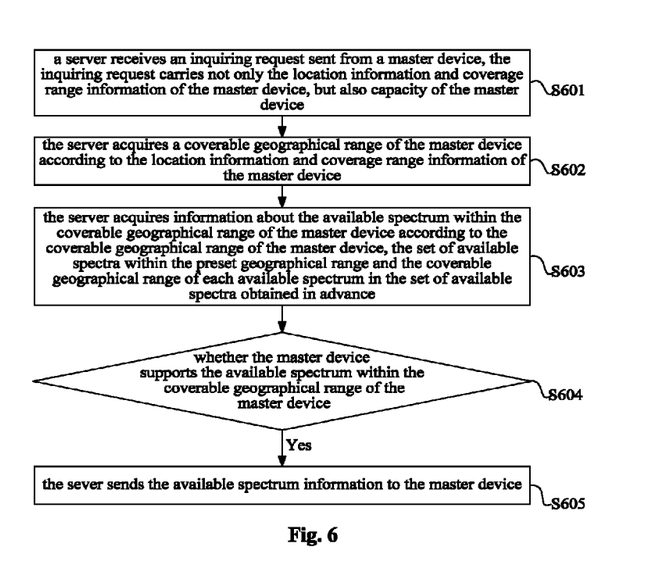
FIG. 6 is a flow chart of a method for acquiring an available spectrum provided by yet another embodiment of the invention.

Based on the foregoing embodiments, FIG. 6 illustrates a flow chart of a method for acquiring an available spectrum provided by yet another embodiment. As shown in FIG. 6, the method includes S601-S605.

In S601, a server receives an inquiring request sent from a master device. The inquiring request carries not only location information of the master device and coverage range information of the master device, but also capacity of the master device.

S602-S603 are the same as S102-S103 and are not repeatedly described herein.

In S604, it is determined whether the master device supports the available spectrum within the coverable geographical range of the master device according to the capacity of the master device.

In a case that the master device supports the available spectrum within the coverable geographical range of the master device, S605 is performed.

It is to be noted that the capacity of the device indicates which modes the device can operate in. The mode may include, for example, Global System for Mobile communications (abbreviated as GSM), Code Division Multiple Access (abbreviated as CDMA), Wideband Division Multiple Access (abbreviated as WCDMA), and Time Division-Synchronous Code Division Multiple Access (abbreviated as TD-SCDMA). In general, the device does not cover the full band and use all available spectra, but only uses available spectra around the working mode it supports.

According to regulations of United States Federal Communications Commission (abbreviated as FCC), a maximum Effective Isotropic Radiated Power (abbreviated as EIRP) of a fixed base station is 4 W, and a maximum EIRP of a handheld mobile terminal is 100 mW. In a case that a maximum EIRP of an available spectrum to be used adjacent to the licensed band is 40 mW, the available spectrum to be used may be regarded as available.

S605 is the same as S104 and is not repeatedly described herein.

Figure 7:
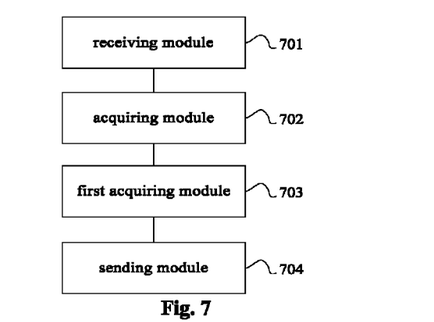
FIG. 7 is a schematic structural diagram of an apparatus for acquiring an available spectrum provided by an embodiment of the invention.

FIG. 7 is a schematic structural diagram of an apparatus for acquiring an available spectrum provided by an embodiment of the invention. As shown in FIG. 7, the apparatus may include a receiving module 701, an acquiring module 702, a first acquiring module 703 and a sending module 704. The receiving module 701 is configured to receive an inquiring request sent from a master device, and the inquiring request carries location information of the master device and coverage range information of the master device. The acquiring module 702 is configured to acquire a coverable geographical range of the master device according to the location information of the master device and the coverage range information of the master device received by the receiving module 701. The first acquiring module 703 is configured to acquire information about the available spectrum within the coverable geographical range of the master device according to the coverable geographical range of the master device acquired by the acquiring module 702, a set of available spectra within a preset geographical range and a coverable geographical range of each available spectrum in the set of available spectra obtained in advance. The sending module 704 is configured to send the information about the available spectrum acquired by the first acquiring module 703 to the master device.

Figure 8:
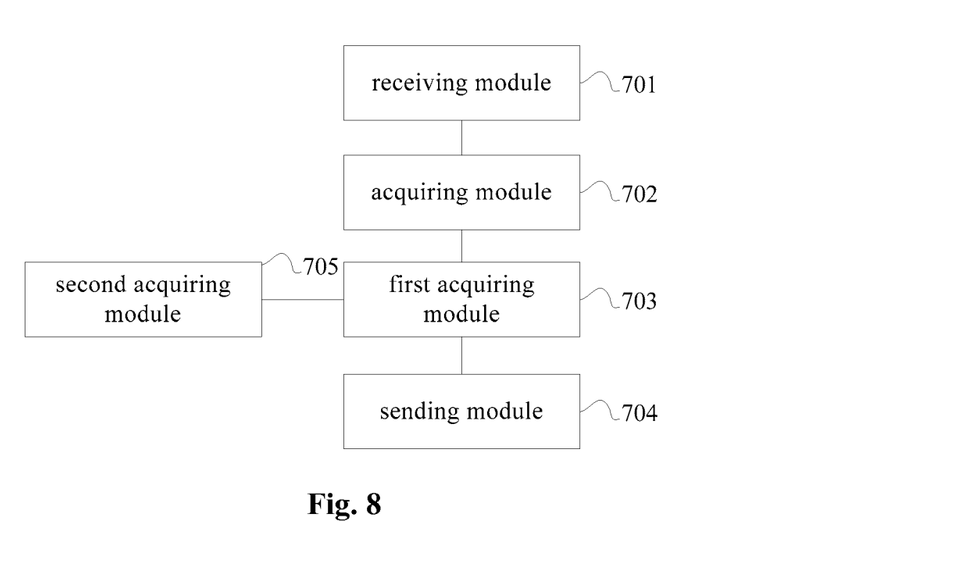
FIG. 8 is a schematic structural diagram of an apparatus for acquiring an available spectrum provided by another embodiment of the invention.

FIG. 8 is a schematic structural diagram of an apparatus for acquiring an available spectrum provided by another embodiment of the invention. Based on the structural diagram of the apparatus shown in FIG. 7, the apparatus may further include a second acquiring module 705, configured to acquire the set of available spectra within the preset geographical range and the coverable geographical range of each available spectrum in the set of available spectra. The second acquiring module 705 may include a receiving unit, a setting unit and a determining unit. The receiving unit is configured to receive at least three measurement reports sent by at least one sensing device within the preset geographical range, and each measurement report includes geographical location of the sensing device and a used spectrum detected at the geographical location by the sensing device. The setting unit is configured to take all used spectra detected, which are received by the receiving unit, as a universal set of used spectra within the preset geographical range, where each used spectrum in the universal set of used spectra covers a sub-area in the preset geographical range. The determining unit is configured to determine the set of available spectra within the preset geographical range and the coverable geographical range of each available spectrum in the set of available spectra according to the universal set of used spectra which is set by the setting unit, and the sub-area in the preset geographical range covered by each used spectrum in the universal set of used spectra.

The determining unit is configured to: in a sub-area which is covered by an i-th used spectrum in the preset geographical range and which is not overlapped with other sub-areas, determine the available spectra as the universal set of used spectra excluding the i-th used spectrum, and determine the coverable geographical range as the sub-area covered by the i-th used spectrum in the preset geographical range; in a sub-area overlapped by a sub-area covered by a j-th used spectrum in the preset geographical range and the sub-area covered by the i-th used spectrum in the preset geographical range, determine the available spectra as the universal set of used spectra excluding the i-th used spectrum and the j-th used spectrum, and determine the coverable geographical range as the sub-area overlapped; where i and j are different positive integers.

Based on the foregoing embodiments, the first acquiring module 703 is configured to take a first available spectrum as the available spectrum within the coverable geographical range of the master device in a case that a coverable geographical range of the first available spectrum in the set of used spectra includes the coverable geographical range of the master device.

Figure 9:
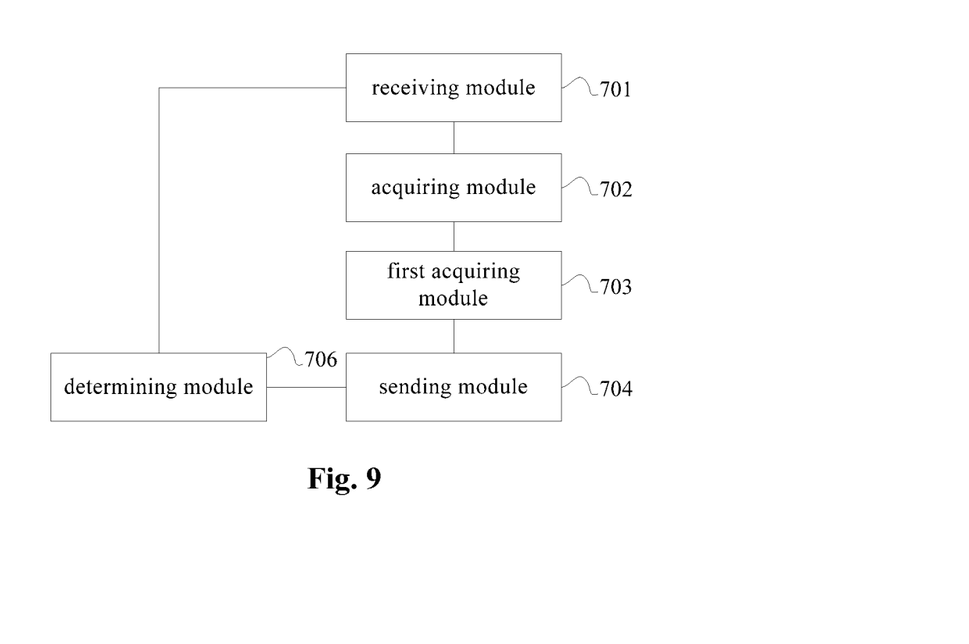
FIG. 9 is a schematic structural diagram of an apparatus for acquiring an available spectrum provided by further another embodiment of the invention.

FIG. 9 is a schematic structural diagram of an apparatus for acquiring an available spectrum provided by further another embodiment of the invention. Based on the structure of the apparatus shown in FIG. 7, the inquiring request received by the receiving module 701 further carries capacity of the master device; and the apparatus may further include a determining module 706, configured to determine whether the master device supports the available spectrum within the coverable geographical range of the master device according to the capacity of the master device received by the receive module 701; and the sending module 704 is configured to send the information about the available spectrum to the master device in case that the determining module 706 determines that the master device supports the available spectrum within the coverable geographical range of the master device.

Figure 10:
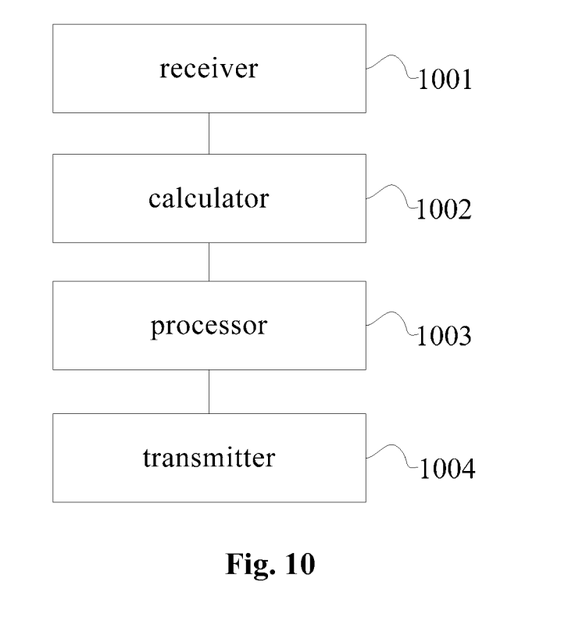
FIG. 10 is a schematic structural diagram of an apparatus for acquiring an available spectrum provided by an embodiment of the invention.

FIG. 10 is a schematic structural diagram of an apparatus for acquiring an available spectrum provided by an embodiment of the invention. As shown in FIG. 10, the apparatus includes a receiver 1001, a calculator 1002, a processor (processor) 1003 and a transmitter 1004. The receiver 1001 is configured to receive an inquiring request sent from a master device, and the inquiring request carries location information of the master device and coverage range information of the master device. The calculator 1002 is configured to acquire a coverable geographical range of the master device according to the location information of the master device and the coverage range information of the master device. The processor 1003 is configured to obtain information about an available spectrum within the coverable geographical range of the master device according to the coverable geographical range of the master device, a set of available spectra within the preset geographical range and a coverable geographical range of each available spectrum in the set of available spectra obtained in advance. The transmitter 1004 is configured to send the information about the available spectrum to the master device.

In an implementation, the receiver 1001 may be further configured to receive at least three measurement reports sent by at least one sensing device in the preset geographical range, and each measurement report includes geographical location of the sensing device and a used spectrum detected at the geographical location by the sensing device; the processor 1003 may be further configured to take all used spectra detected as a universal set of used spectra within the preset geographical range, where each used spectrum in the universal set of used spectra covers a sub-area in the preset geographical range; and determine the set of available spectra within the preset geographical range and the coverable geographical range of each available spectrum in the set of available spectra according to the universal set of used spectra and the sub-area in the preset geographical range covered by each used spectrum in the universal set of used spectra.

The processor 1003 may determine the set of available spectra within the preset geographical range and the coverable geographical range of each available spectrum in the set of available spectra by: in a sub-area which is covered by an i-th used spectrum in the preset geographical range and which is not overlapped with other sub-areas, determining the available spectra as the universal set of used spectra excluding the i-th used spectrum and determining the coverable geographical range as the sub-area covered by the i-th used spectrum in the preset geographical range; and in a sub-area overlapped by a sub-area covered by a j-th used spectrum in the preset geographical range and the sub-area covered by the i-th used spectrum in the preset geographical range, determining the available spectra as the universal set of used spectra excluding the i-th used spectrum and the j-th used spectrum, and determining the coverable geographical range as the sub-area overlapped; where i and j are different positive integers.

In an implementation, the processor 1003 may obtain the information about the available spectrum within the coverable geographical range of the master device by taking a first available spectrum in the set of available spectra as the available spectrum within the coverable geographical range of the master device in a case that the coverable geographical range of the first available spectrum includes the coverable geographical range of the master device.

In another implementation, the inquiring request received by the receiver 1001 further carries capacity of the master device, and the processor 1003 may be further configured to determine whether the master device supports the available spectrum within the coverable geographical range of the master device according to the capacity of the master device, and the transmitter 1004 is further configured to send the information about the available spectrum to the master device in a case that the processor 1003 determines that the master device supports the available spectrum within the coverable geographical range of the master device.

Those skilled in the art can understand that all or a few steps of the foregoing embodiments may be implemented by program instruction related hardware. The program may be stored in a computer readable storage medium. When the program is executed, the steps of the foregoing embodiments of the method are performed. The storage medium includes medium where program code can be stored, such as a ROM, a RAM, a disk, or an optical disc.

It is to be noted finally that: the foregoing embodiments are merely adopted to describe technical solutions of the invention, but not to limit the invention. Although the technical solutions of the invention are described in detail by reference to the foregoing embodiments, those skilled in the art should understand that the technical solutions in the foregoing embodiments may be modified, or a few or all technical features may be replaced by their equivalents; and with the modifications or the replacements, the essence of the corresponding technical solution does not depart from the scope of the technical solutions in the embodiments of the invention.

What is claimed is:

1. A method for providing an available spectrum, comprising:
   receiving, by a server, an inquiring request from a master device, wherein the inquiring request carries location information of the master device and coverage range information of the master device;
   determining, by the server, a coverable geographical range of the master device according to the location information of the master device and the coverage range information of the master device;
   determining, by the server, information about the available spectrum within the coverable geographical range of the master device according to the coverable geographical range of the master device, a set of available spectra within a preset geographical range obtained in advance and a coverable geographical range of each available spectrum in the set of available spectra obtained in advance; and
   sending the information about the available spectrum to the master device,
   wherein the inquiring request further carries capacity of the master device; and
   wherein after determining the information about the available spectrum within the coverable geographical range of the master device, the method further comprises:
   determining whether the master device supports the available spectrum within the coverable geographical range of the master device according to the capacity of the master device; and
   wherein sending the information about the available spectrum to the master device is based on the master device supporting the available spectrum within the coverable geographical range of the master device.

2. The method according to claim 1, further comprising:
receiving at least three measurement reports from at least one sensing device within the preset geographical range, wherein each measurement report comprises geographical location of the at least one sensing device and a used spectrum detected at the geographical location by the at least one sensing device;
determining a universal set of used spectra within the preset geographical range based on all used spectra detected, wherein each used spectrum in the universal set of used spectra covers a sub-area in the preset geographical range; and
determining the set of available spectra within the preset geographical range and the coverable geographical range of each available spectrum in the set of available spectra according to the universal set of used spectra and the sub-area in the preset geographical range covered by each used spectrum in the universal set of used spectra.

3. The method according to claim 2, wherein determining the set of available spectra within the preset geographical range and the coverable geographical range of each available spectrum in the set of available spectra further comprises:
in a sub-area covered by an i-th used spectrum in the preset geographical range and not overlapped with other sub-areas, determining the available spectra as the universal set of used spectra excluding the i-th used spectrum, and determining the coverable geographical range as the sub-area covered by the i-th used spectrum in the preset geographical range; and
in a sub-area covered by the i-th used spectrum in the preset geographical range and overlapped by a sub-area covered by a j-th used spectrum in the preset geographical range, determining the available spectra as the universal set of used spectra excluding the i-th used spectrum and the j-th used spectrum, and determining the coverable geographical range as the sub-area overlapped;
wherein i and j are different positive integers.

4. The method according to claim 3, wherein determining the information about the available spectrum further comprises:
designating a first available spectrum in the set of available spectra as the available spectrum within the coverable geographical range of the master device based on a coverable geographical range of the first available spectrum comprising the coverable geographical range of the master device.

5. The method according to claim 4, wherein the inquiring request further carries capacity of the master device; and
wherein after determining the information about the available spectrum within the coverable geographical range of the master device, the method further comprises:
determining whether the master device supports the available spectrum within the coverable geographical range of the master device according to the capacity of the master device; and
wherein sending the information about the available spectrum to the master device is based on the master device supporting the available spectrum within the coverable geographical range of the master device.

6. The method according to claim 2, wherein determining the information about the available spectrum further comprises:
designating a first available spectrum in the set of available spectra as the available spectrum within the coverable geographical range of the master device based on a coverable geographical range of the first available spectrum comprising the coverable geographical range of the master device.

7. The method according to claim 6, wherein the inquiring request further carries capacity of the master device; and
wherein after determining the information about the available spectrum within the coverable geographical range of the master device, the method further comprises:
determining whether the master device supports the available spectrum within the coverable geographical range of the master device according to the capacity of the master device; and
wherein sending the information about the available spectrum to the master device is based on the master device supporting the available spectrum within the coverable geographical range of the master device.

8. The method according to claim 1, wherein determining the information about the available spectrum further comprises:
designating a first available spectrum in the set of available spectra as the available spectrum within the coverable geographical range of the master device based on a coverable geographical range of the first available spectrum comprising the coverable geographical range of the master device.

9. The method according to claim 8, wherein the inquiring request further carries capacity of the master device; and
wherein after determining the information about the available spectrum within the coverable geographical range of the master device, the method further comprises:
determining whether the master device supports the available spectrum within the coverable geographical range of the master device according to the capacity of the master device; and
wherein sending the information about the available spectrum to the master device is based on the master device supporting the available spectrum within the coverable geographical range of the master device.

10. An apparatus for providing an available spectrum, the apparatus comprising a processor and a non-transitory processor-readable medium having processor-executable instructions stored thereon, the processor-executable instructions including a plurality of modules, the modules comprising:
a receiving module, configured to receive an inquiring request from a master device, wherein the inquiring request carries location information of the master device and coverage range information of the master device;
a determining module, configured to determine a covetable geographical range of the master device according to the location information of the master device and the coverage range information of the master device, and to determine information about the available spectrum within the covetable geographical range of the master device according to the covetable geographical range of the master device, a set of available spectra within a preset geographical range and a covetable geographical range of each available spectrum in the set of available spectra; and
a sending module, configured to send the information about the available spectrum to the master device,
wherein the inquiring request further carries capacity of the master device;
wherein the determining module is further configured to determine whether the master device supports the available spectrum within the coverable geographical range of the master device according to the capacity of the master device received by the receive module; and wherein sending the information about the available spectrum to the master device is based on the determination that the master device supports the available spectrum within the coverable geographical range of the master device.

11. The apparatus according to claim 10, wherein the receiving module is further configured to receive at least three measurement reports from at least one sensing device within the preset geographical range, wherein each measurement report comprises geographical location of the sensing device and a used spectrum detected at the geographical location by the sensing device; and wherein the determining module is further configured to determine a universal set of used spectra within the preset geographical range based on all used spectra detected, wherein each used spectrum in the universal set of used spectra covers a sub-area in the preset geographical range, and to determine the set of available spectra within the preset geographical range and the coverable geographical range of each available spectrum in the set of available spectra according to the universal set of used spectra and the sub-area in the preset geographical range covered by each used spectrum in the universal set of used spectra.

12. The apparatus according to claim 11, wherein the determining module is further configured to:

in a sub-area covered by an i-th used spectrum in the preset geographical range and not overlapped with other sub-areas, determine the available spectra as the universal set of used spectra excluding the i-th used spectrum, and determine the coverable geographical range as the sub-area covered by the i-th used spectrum in the preset geographical range; and in a sub-area covered by the i-th used spectrum in the preset geographical range and overlapped by a sub-area covered by a j-th used spectrum in the preset geographical range, determine the available spectra as the universal set of used spectra excluding the i-th used spectrum and the j-th used spectrum, and determine the coverable geographical range as the sub-area overlapped;

wherein i and j are different positive integers.

13. The apparatus according to claim 12, wherein the determination of the available spectrum within the coverable geographical range of the master device includes designating a first available spectrum in the set of available spectra as the available spectrum within the coverable geographical range of the master device based on a coverable geographical range of the first available spectrum comprising the coverable geographical range of the master device.

14. The apparatus according to claim 13, wherein the inquiring request further carries capacity of the master device;

wherein the determining module is further configured to determine whether the master device supports the available spectrum within the coverable geographical range of the master device according to the capacity of the master device received by the receive module; and wherein sending the information about the available spectrum to the master device is based on the determination that the master device supports the available spectrum within the coverable geographical range of the master device.

15. The apparatus according to claim 11, wherein the determination of the available spectrum within the coverable geographical range of the master device includes designating a first available spectrum in the set of available spectra as the available spectrum within the coverable geographical range of the master device based on a coverable geographical range of the first available spectrum comprising the coverable geographical range of the master device.

16. The apparatus according to claim 15, wherein the inquiring request further carries capacity of the master device;

wherein the determining module is further configured to determine whether the master device supports the available spectrum within the coverable geographical range of the master device according to the capacity of the master device received by the receive module; and wherein sending the information about the available spectrum to the master device is based on the determination that the master device supports the available spectrum within the coverable geographical range of the master device.

17. The apparatus according to claim 10, wherein the determination of the available spectrum within the coverable geographical range of the master device includes designating a first available spectrum in the set of available spectra as the available spectrum within the coverable geographical range of the master device based on a coverable geographical range of the first available spectrum comprising the coverable geographical range of the master device.

18. The apparatus according to claim 17, wherein the inquiring request further carries capacity of the master device;

wherein the determining module is further configured to determine whether the master device supports the available spectrum within the coverable geographical range of the master device according to the capacity of the master device received by the receive module; and wherein sending the information about the available spectrum to the master device is based on the determination that the master device supports the available spectrum within the coverable geographical range of the master device.

* * * * *